United States Patent [19]

Isayama

[11] 4,034,380

[45] July 5, 1977

[54] INK EJECTION APPARATUS FOR PRINTER

[75] Inventor: Takuro Isayama, Tokyo, Japan

[73] Assignee: Ricoh Co., Ltd., Tokyo, Japan

[22] Filed: Apr. 6, 1976

[21] Appl. No.: 674,187

[30] Foreign Application Priority Data

Apr. 8, 1975 Japan .............................. 50-42620

[52] U.S. Cl. ............................. 346/140 R; 346/75; 310/8.1

[51] Int. Cl.² ..................... G01D 15/18; H01V 7/00

[58] Field of Search ............... 346/75, 140; 310/8.1

[56] References Cited

UNITED STATES PATENTS

| | | | |
|---|---|---|---|
| 3,747,120 | 7/1973 | Stemme | 346/140 X |
| 3,787,882 | 1/1974 | Fillmore et al. | 346/140 X |
| 3,820,121 | 6/1974 | Rich et al. | 346/140 |
| 3,930,260 | 12/1975 | Sicking | 346/140 R |
| 3,950,762 | 4/1976 | Anderka | 346/140 R |
| 3,967,286 | 6/1976 | Anderson et al. | 346/140 R |
| 3,971,039 | 7/1976 | Takano et al. | 346/140 R X |

FOREIGN PATENTS OR APPLICATIONS

| | | | |
|---|---|---|---|
| 2,532,037 | 1/1976 | Germany | 346/140 |

*Primary Examiner*—George H. Miller, Jr.
*Attorney, Agent, or Firm*—Frank J. Jordan

[57] ABSTRACT

Ink is fed into an ink chamber in an ink ejection head. An ejection orifice communicates with the ink chamber. An electrostrictive plate defines a surface of the ink chamber and is strained to decrease the volume of the ink chamber when an electrical pulse is applied thereto to cause ink to be ejected through the orifice. The apparatus is inoperative if there is no ink in the ink chamber or there are air bubbles in the ink in the ink chamber. In such a case the voltage across the electrostrictive plate has an oscillating component, the oscillating component being damped out when the ink chamber is completely filled with ink. A sensor is provided to detect the oscillating component and generate a signal indicating said detection. Circuit means are provided to increase the magnitude of the pulse when the oscillating component has a magnitude indicating that the apparatus is not inoperative but some bubbles are present in the chamber. The increased pulse magnitude serves to maintain the ink ejection at the desired level.

8 Claims, 18 Drawing Figures

| V | CM3 OUT | CM2 OUT | CM1 OUT |
|---|---|---|---|
| $V < V_1$ | LOW | LOW | LOW |
| $V_1 \leq V < V_2$ | HIGH | LOW | LOW |
| $V_2 \leq V < V_3$ | HIGH | HIGH | LOW |
| $V_3 \leq V$ | HIGH | HIGH | HIGH |

INK EJECTION APPARATUS FOR PRINTER

BACKGROUND OF THE INVENTION

The present invention relates to an ink ejection apparatus which may be incorporated into a printer for a computer, facsimile system or the like.

An ink ejection apparatus is known in which an ink ejection head is formed with an ink chamber and an ejection orifice communicating with the ink chamber. An electrostrictive plate is provided which defines part of the ink chamber. An electrical pulse applied to the electrostrictive plate causes the same to strain in such a manner as to decrease the volume of the ink chamber and cause ink to be ejected through the orifice. Since the strain is small in magnitude, the apparatus is inoperative if there are air bubbles in the ink in the ink chamber and of course is inoperative if there is no ink in the ink chamber. Since the ink is incompressible, a small reduction of volume of the ink chamber will cause the same volume of ink to be positively displaced out the orifice. However, since air is compressible, such a small reduction in volume of the ink chamber will compress air bubbles in the ink chamber, and the increase in pressure will be insufficient to force ink out of the orifice due to the design of the ejection head. If air bubbles should become present in the ejection head during a printing operation of, for example, computer data, the whole data will not be printed out. Such a malfunction may not be noticed, especially if the printout does not terminate in the middle of a sentence, and may result in a serious error in judgement by the concern utilizing the apparatus due to failure to print out important information.

SUMMARY OF THE INVENTION

It is an important object of the present invention to provide an ink ejection apparatus comprising means for detecting a lack of ink or air bubbles in an ink chamber thereof.

It is another object of the present invention to provide an ink ejection apparatus comprising means operative to detect a volume of air in an ink chamber of an ejection head which is sufficient to prevent ink ejection and produce a signal indicating the same.

It is another object of the present invention to provide an ink ejection apparatus comprising an electrostrictive plate to reduce the volume of an ink chamber upon application of an electrical pulse thereto and means to increase the magnitude of the electrical pulse when a small amount of air is present in the chamber.

It is another object of the present invention to provide an ink ejection apparatus comprising electrical means to detect oscillation of an electrostrictive plate indicating that air is present in an ink chamber of the apparatus.

Other objects, together with the foregoing, are attained in the embodiments described in the description and illustrated in the accompanying drawings.

DESCRIPTION OF THE PREFERRED EMBODIMENTS

While the ink ejection apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
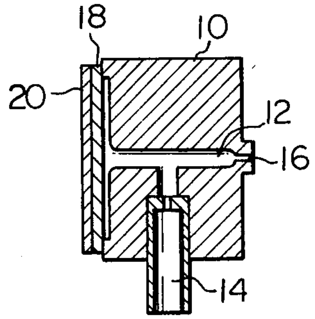
FIG. 1 is a cross-section of an ink ejection head constituting part of an ink ejection apparatus embodying the present invention.

In FIG. 1, ink ejection apparatus embodying the present invention comprises an ink ejection head 10 formed with an ink chamber 12. Ink is supplied into the ink chamber 12 from a pump (not shown) through an inlet 14. An ejection nozzle or orifice 16 communicates with the ink chamber 12. The ink pressure in the ink chamber 12 is normally insufficient to overcome the surface tension in the orifice 16 so that ink is retained in the ink chamber 12.

A flexible plate 18 defines the left surface of the ink chamber 12, and an electrostrictive member or plate 20 is firmly attached to the plate 18 by an adhesive. The plate 20 is formed of a dielectric material having the property that a mechanical deformation or strain thereof results from the application of an electrical field thereto which is proportional to the square of the field. This deformation results from the induced dipole moment caused by the applied field. The plate 20 is arranged so that an electrical pulse applied thereto causes the plate 20 and the plate 18 fixed thereto to deform in such a manner as to decrease the volume of the ink chamber 12. Due to the rapid pressure increase and the incompressibility of the ink, a small amount of ink is ejected through the orifice 16 having a volume equal to the volume change of the ink chamber 12. This volume of ink is preferably suitable to print a dot on a sheet of printout paper (not shown).

If, however, there are air bubbles in the ink chamber 12 or there is no ink in the ink chamber 12, the apparatus will either fail to operate or eject a reduced volume of ink from the orifice 16 depending on the amount of air present in the ink chamber 12. This is because the reduction of the volume of the ink chamber 12 will compress the air, but the increased pressure in the ink chamber 12 will be insufficient to overcome the surface tension at the orifice 16 and cause the proper amount of ink to be ejected through the orifice 16.

The electrical pulse applied to the plate 20 causes the same not only to deform, but also to ring or oscillate when the plate 20 is in its free state. However, when the ink chamber 12 is completely filled with ink, this oscillation is damped out due to the resistance to rapid movement which the ink presents to the plates 18 and 20. Oscillation of the plate 20 when electrically pulsed therefore indicates the presence of air in the ink chamber 12, and the magnitude of the oscillations corresponds to the amount of air.

The electrical voltage accross the plate 20 may thereby comprise two components; a DC component corresponding to the level of the applied pulse and an AC or oscillating component which is present when there is air in the ink chamber 12.

Figure 2:
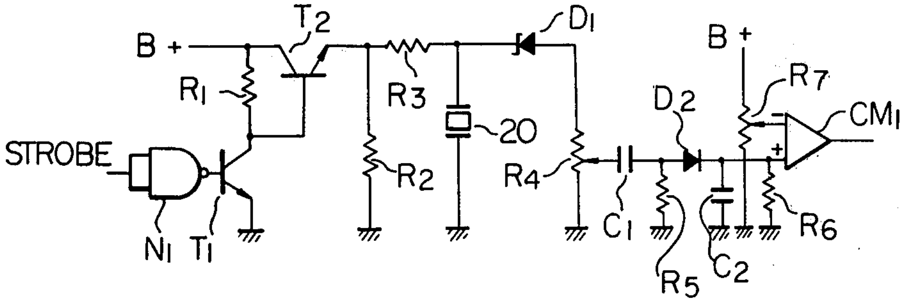
FIG. 2 is a schematic diagram of a first embodiment of the invention.

A circuit is shown in FIG. 2 for extracting the oscillating component of the voltage across the plate 20, comparing the magnitude of the oscillating component with a predetermined value and producing an electrical signal when the magnitude of the oscillating component is above the predetermined value.

A STROBE pulse is applied to parallel inputs of a NAND gate N1 which serves as a driver for an NPN switching transistor T1. The output of the NAND gate N1 is connected to the base of the transistor T1, and the emitter of the transistor T1 is grounded. The collector of the transistor T1 is connected to the base of an NPN pulsing transistor T2 and also to a voltage supply B+ through a load resistor R1. The transistor T2 is connected as an emitter follower with its collector connected to the supply B+ and its emitter grounded through a load resistor R2. The emitter of the transistor T2 is also connected to ground through the series combination of a resistor R3 and the plate 20. The junction of the resistor R3 and plate 20 is connected to the cathode of a Zener diode D1, the anode of which is grounded through the resistance element of a potentiometer R4. The slider of the potentiometer R4 is connected to one plate of a coupling capacitor C1, the other plate of which is grounded through a resistor R5. The junction of the capacitor C1 and the resistor R5 is connected to the anode of a diode D2, which serves as a rectifier, the cathode of which is grounded through the parallel combination of a capacitor C2 and a resistor R6. The capacitor C2 serves as a smoothing filter and the resistor R6 serves as a bleeder for the capacitor C2.

The cathode of the diode D2 is also connected to a positive input of a voltage comparator CM1, the output of which may be connected to a lamp or buzzer, a circuit for terminating the printout operation of a computer, etc. (not shown).

A potentiometer R7 is connected between the supply B+ and ground to provide an adjustable reference voltage for the comparator CM1. The slider of the potentiometer R7 is connected to a negative input of the voltage comparator CM1.

In operation, the input to the NAND gate N1 is normally held low so that the output of the NAND gate N1 is high. This high output turns on the switching transistor T1 so that the voltage at the collector thereof and also at the base of the pulsing transistor T2 is low. The pulsing transistor T2 is thereby turned off, producing a low output at its emitter.

Figure 3A:
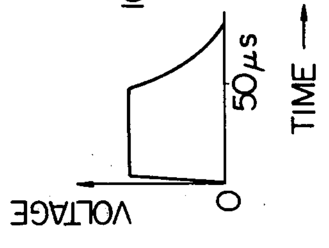
FIGS. 3*a* and 3*e* are graphs illustrating the operation of the embodiment of FIG. 2.

The positive STROBE pulse applied to the input of the NAND gate N1 causes the NAND gate N1 to produce a low output which turns off the switching transistor T1. The collector voltage of the transistor T1 which is applied to the base of the pulsing transistor T2 goes high thereby turning on the transistor T2. The transistor T2 thereby produces a high output at its emitter which is applied to the plate 20 through the resistor R3. This causes the plate 20 to deform and eject ink out of the orifice 16. The voltage at the emitter of the transistor T2, which is the driving pulse for the plate 20, is shown in FIG. 3*a*. The plate 20, being a dielectric, has a certain amount of capacitance. As the transistor T2 is turned on, the plate 20 acts as a capacitor which charges through the resistor R3. This determines the shape of the leading edge of the pulse shown in FIG. 3*a*. As the transistor T2 is turned off, the plate 20 discharges through the resistors R3 and R2. This determines the shape of the trailing edge of the pulse shown in FIG. 3*a*.

Figure 3B:
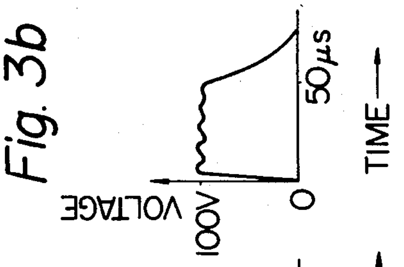
Figure 3C:
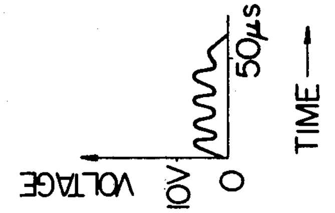

If the voltage across the plate 20 has no oscillating component, indicating that there is no air in the ink chamber 12, the voltage across the plate 20 will also have the shape shown in FIG. 3*a*. In this case, no Ac voltage will be coupled through the capacitor C1 and the comparator CM1 will produce a low output. If, however, there is air in the ink chamber 12, the voltage across the plate 20 will appear as in FIG. 3*b*. In this case, the oscillating or AC component is superimposed on the DC level of the pulse as shown in FIG. 3*a*. The voltage across the plate 20, minus the zener voltage of the diode D1, appears across the potentiometer R4. The potentiometer R4 is suitably adjusted so that the voltage at its slider appears as in FIG. 3*c*.

Figure 3D:
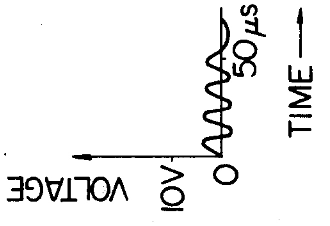
Figure 3E:
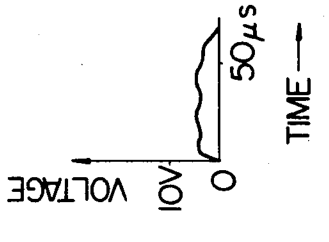

The capacitor C1 and resistor R5 are selected to pass the oscillating component of the voltage at the slider of the potentiometer R4 and block the DC component, thereby serving as a high pass filter. The voltage at the anode of the diode D2 is shown in FIG. 3*d*, and consists only of the oscillating component of the voltage at the slider of the potentiometer R4. This voltage is half-wave rectified by the diode D2 and charges the capacitor C2. The rectified voltage is smoothed by the capacitor C2 and appears as in FIG. 3*e*. The resistor R6 serves as a bleeder to discharge the capacitor C2 between pulses.

The voltage at the cathode of the diode D2 is compared with the reference voltage at the slider of the potentiometer R7, which is adjusted to a suitable value. If the voltage at the cathode of the diode D2 is lower than the reference voltage indicating that there is not enough air in the ink chamber 12 to prevent ink ejection, the comparator CM1 produces a low output. If, however, the voltage at the cathode of the diode D2 is above the reference voltage indicating that an intolerable amount of air is in the ink chamber 12, the comparator CM1 produces a high output to sound an alarm, terminate a printout operation or the like.

Figure 4:
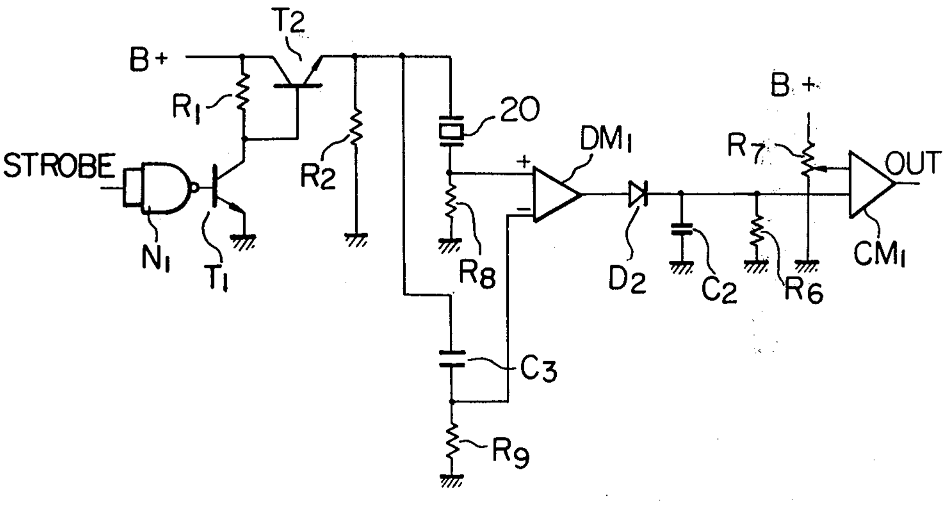
FIG. 4 is a schematic diagram of a second embodiment of the invention.
Figure 5A:
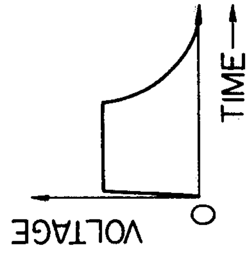
FIGS. 5*a* and 5*d* are graphs illustrating the operation of the embodiment shown in FIG. 4.

Another embodiment of the invention is shown in FIG. 4, and like elements are designated by the same reference characters. The pulse at the emitter of the pulsing transistor T2 is the same as in the embodiment shown in FIG. 2, and is shown in FIG. 5*a*. In the embodiment of FIG. 4, however, the emitter of the transistor T2 is connected to ground through the plate 20 and a resistor R8, the junction thereof being connected to a positive input of differential amplifier DM1. The emitter of the transistor T2 is also grounded through a capacitor C3 having the same value as the capacitance of the plate 20 and a resistor R9 having the same value as the resistor R8. The junction of the capacitor C3 and the resistor R9 is connected to a negative input of the differential amplifier DM1. The output of the differential amplifier DM1 is connected to the anode of the diode D2.

Figure 5B:
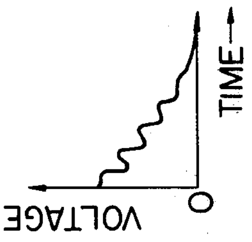
Figure 5C:
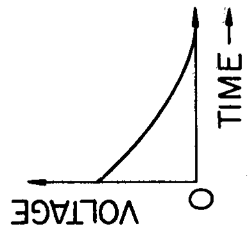
Figure 5D:
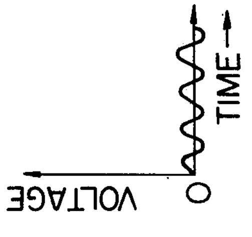

The capacitor C3 and resistor R9 constitute a differentiating circuit whereby the voltage shown in FIG. 5*c* is developed across the resitor R9 in response to the pulse shown in FIG. 5*a*. The plate 20 and resistor R8 also constitute a differentiating circuit having the same time constant as the differentiating circuit constituted by the capacitor C3 and resistor R9. If there is no air in the ink chamber 12, the voltage across the resistor R8 will be substantially identical to the voltage across the resistor R9 as shown in FIG. 5c, and the output of the differential amplifier DM1 will be zero at all times. If, however, there is air in the ink chamber 12, the voltage across the plate 20 will have an oscillating component and the voltage across the resistor R8 will appear as in FIG. 5b. Since the difference between the positive and negative inputs to the differential amplifier DM1 is constituted by the oscillating component, the oscillating component will appear as the output of the differential amplifier DM1 as shown in FIG. 5d. The waveform of FIG. 5d is essentially similar to that shown in FIG. 3d, and is rectified, filtered and applied to the voltage comparator CM1 in the same manner as in the embodiment of FIG. 2. It will be seen that the embodiment of FIG. 4 is identical to the embodiment of FIG. 2 except for the manner in which the oscillating component is extracted from the voltage across the plate 20.

Figure 6A:
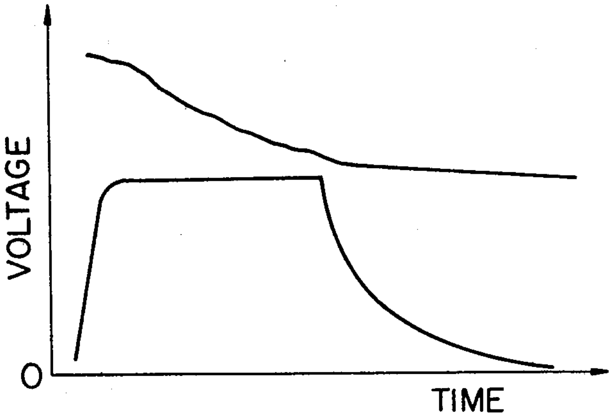
FIGS. 6*a* and 6*c* are graphs further illustrating the operation of the embodiment of FIG. 4.
Figure 6B:
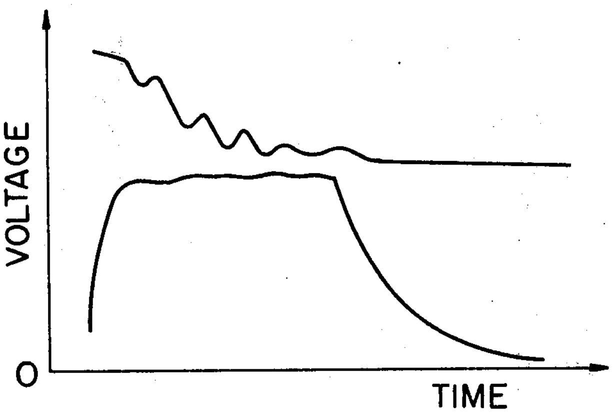
Figure 6C:
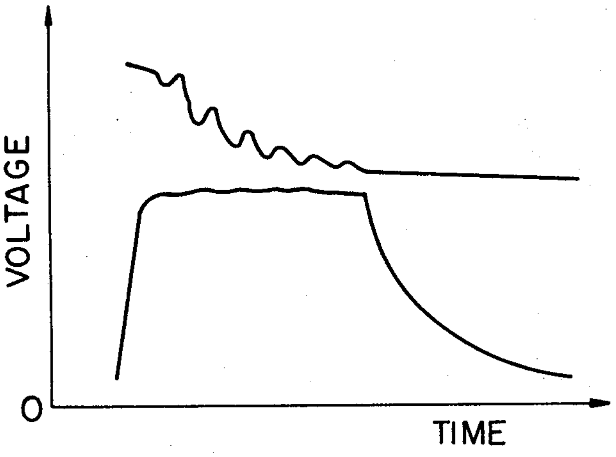

In FIG. 6a, the upper curve represents the emitter voltage of the transistor T2 and the lower curve represents the voltage across the resistor R8 in a case in which there is no air in the ink chamber 12. FIG. 6b is similar to FIG. 6a but represents a case in which there are air bubbles in the air chamber 12. FIG. 6c similarly represents a case in which there is no ink in the ink chamber 12.

Figure 7:
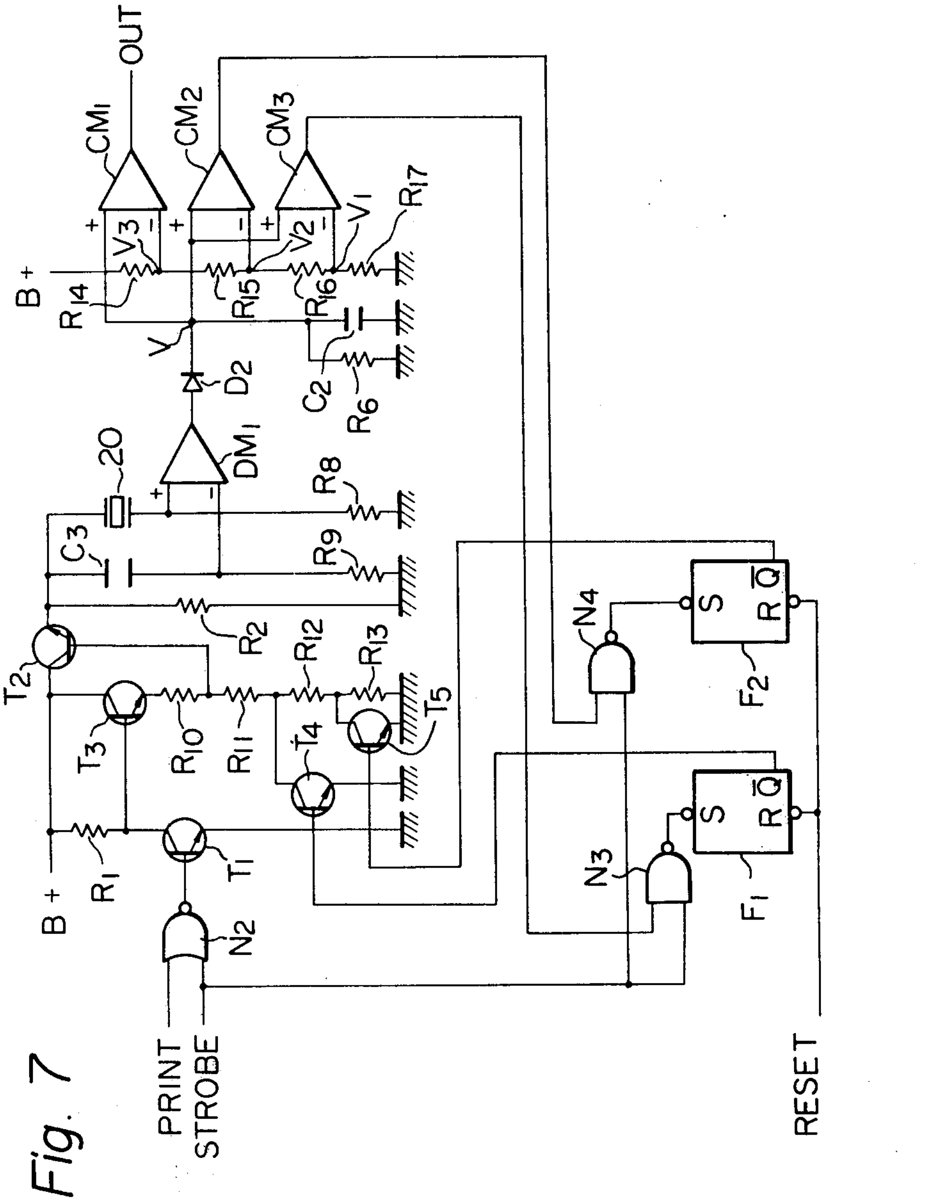
FIG. 7 is a schematic diagram of the embodiment of FIG. 4 further comprising test control circuitry.

FIG. 7 shows the embodiment of FIG. 4 in combination with means for increasing the magnitude of the pulse applied to the plate 20 when there are air bubbles in the ink chamber 12, but not enough air bubbles to prevent the apparatus from ejecting ink. Like elements are designated by the same reference characters.

A NOR gate N2 has inputs connected to receive both the STROBE pulse and a PRINT pulse which is producted when it is desired to eject ink without sensing for air in the ink chamber 12. The output of the NOR gate N2 is connected to the base of the switching transistor T1. In this modified embodiment, however, the collector of the transistor T1 is not connected directly to the base of the pulsing transistor T2, but is connected thereto through an NPN regulator transistor T3. The collector of the transistor T1 is connected to the base of the transistor T3, the collector of which is connected to the supply B+. The emitter of the transistor T3 is grounded through resistors R10 to R13, with the junction of the resistors R10 and R11 being connected to the base of the transistor T2. The collector of an NPN transistor T4 is connected to the junction of the resistors R11 and R12, with the emitter of the transistor T4 being grounded. The collector of an NPN transistor T5 is connected to the junction of the resistors R12 and R13, with the emitter of the transistor T5 being grounded.

In addition to being connected to the positive input of the voltage comparator CM1, the cathode of the diode D2 is also connected to positive inputs of voltage comparators CM2 and CM3 which are identical to the voltage comparator DM1. Resistors R14 and R17 are connected in series between the supply B+ and ground to constitute a reference voltage divider. The values of the resistors R14 and R17 are selected so that the voltage at the junction of the resistors R14 and R15 which is applied to the negative input of the voltage comparator CM1 is the same as in FIG. 2. The junction of the resistors R15 and R16 is connected to the negative input of the voltage comparator CM2 and the junction of the resistors R16 and R17 is connected to the negative input of the voltage comparator CM3. The reference voltages at the negative inputs to the comparators CM3, CM2 and CM1 are designated as V1, V2 and V3 respectively, with V3 being the highest and V1 being the lowest. The voltage at the cathode of the diode D2 is designated as V. The relationship of the outputs of the voltage comparators CM1 to CM3 to the voltage V is shown in FIG. 9.

The output of the voltage comparator CM3 is connected to an input of a NAND gate N3, another input of which is connected to receive the STROBE pulse. The output of the NAND gate N3 is connected to an inverting set input S of a flip-flop F1. The inverting output $\overline{Q}$ of the flip-flop F1 is connected to the base of the transistor T4. The output of the voltage comparator CM2 is connected to an input of a NAND gate N4, another input of which is connected to receive the STROBE pulse. The output of the NAND gate N4 is connected to an inverting set input S of a flip-flop F2. The inverting output $\overline{Q}$ of the flip-flop F2 is connected to the base of the transistor T5. Inverting reset inputs R of the flip-flops F1 and F2 are adapted to receive a RESET pulse.

Figures 8, 9:
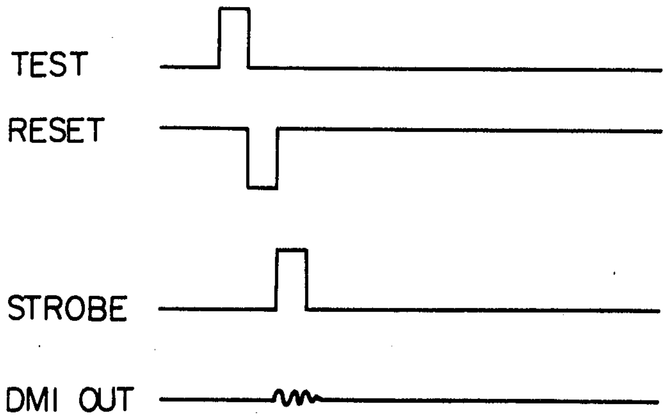
FIG. 8 is a timing chart illustrating the operation of the circuitry of FIG. 7.
FIG. 9 is a logic table illustrating the operation of the circuitry of FIG. 7.

The printer preferably comprises pulse generator means (not shown) to generate a positive TEST pulse as shown in FIG. 8. The trailing edge of the TEST pulse triggers the negative RESET pulse, the trailing edge of which triggers the positive STROBE pulse. The TEST pulse is preferably generated at the beginning of each line of printing.

In operation, the RESET pulse resets the flip-flops F1 and F2. The STROBE pulse applied to the NAND gate N3 and N4 enables the same. The input to the NOR gate N2 is normally low, so that the NOR gate N2 produces a high output which turns on the transistor T1. The low output of the transistor T1 turns off the regulator transistor T3, which in turn produces a low output to turn off the pulsing transistor T2. In response to the STROBE pulse, the NOR gate N2 produces a low output which turns off the transistor T1. The high output of the transistor T1 turns on the regulator transistor T3, which produces a high output to turn on the pulsing transistor T2 and generate the pulse to strain the plate 20.

Since the flip-flops F1 and F2 were reset, the $\overline{Q}$ outputs thereof are high which turn on the transistors T4 and T5. The transistor T4 effectively shorts out the resistors R12 and R13 thereby placing the junction of the resistors R11 and R12 at substantially ground potential. With the transistor T1 turned off, the base potential of the transistor T3 is very close to B+ and the emitter-collector resistance of the transistor T3 is very low. The potential at the emitter of the transistor T3 is also close to B+. This voltage is divided by the resistors R10 and R11 and applied to the base of the transistor T2. In this case, the base voltage of the transistor T2 has a minimum value for pulsing the plate 20, and the magnitude of the pulse applied to the plate 20 has a minimum value.

If there is no air in the ink chamber 12, the differential amplifier DM1 will produce a low output (the voltage V will be below V1) and the voltage comparators CM1 to CM3 will also produce low outputs. There will be no change in the status of the apparatus until the application of the next TEST pulse. A number of PRINT pulses are applied to the NOR gate N2 to print one line.

If, however, there is air in the ink chamber 12, the differential amplifier DM1 will produce an output and the voltage V at the cathode of the diode D2 will have a magnitude corresponding to the amount of air. If the voltage V is between V1 and V2 indicating that there is a small amount of air in the ink chamber 12 but that the apparatus is still operative to eject ink, the voltage comparator CM3 will produce a high output which is gated through the NAND gate N3 to set the flip-flop F1. The $\overline{Q}$ output of the flip-flop F1 goes low thereby turning off the transistor T4. The junction of the resistors R12 and R13 is thereby placed at substantially ground potential since the transistor T5 is still turned on, and the voltage at the emitter of the transistor T3 is divided by the resistors R10 to R12. The voltage at the base of the transistor T2 is therefore higher than in the previous case, and the magnitude of the pulse applied to the plate 20 is greater to cause greater reduction of the volume of the ink chamber 12.

If the voltage V is between V2 and V3, the voltage comparator CM2 will also produce a high output to set the flip-flop F2 and turn off the transistor T5. The emitter voltage of the transistor T3 is in this case divided by the resistors R10 to R13 and the potential at the base of the transistor T2 is even greater. The magnitude of the pulse applied to the plate 20 has a maximum value.

If the voltage V is greater than the reference voltage V3, indicating that the apparatus is inoperative, the voltage comparator CM1 also produces a high output to energize a buzzer or the like or terminate the printout operation.

From the foregoing, it will be seen that the present invention provides security for an ink ejection printing system by ensuring that information will not be lost due to a failure of the ejection head. Many modifications are possible within the scope of the invention by those skilled in the art.

What is claimed is:

1. Ink ejection apparatus, comprising:

an ink ejection head defining an ink chamber and an ejection orifice communicating with the ink chamber;

an electrostrictive member defining part of the ink chamber;

a pulse generator to feed a pulse to the electrostrictive member to cause reduction of a volume of the ink chamber; and sensor means to detect oscillation of the electrostrictive member during a duration of the pulse and produce an electrical signal in response thereto that indicates whether there is sufficient ink in the ink chamber.

2. The ink ejection apparatus of claim 1, further comprising reset means to render the sensor means inoperative until receipt of a test signal, the sensor means being operative to detect oscillation of the electrostrictive member in response to the test signal.

3. The ink ejection apparatus of claim 1, in which the sensor means comprises extraction means to extract an oscillating component of a voltage across the electrostrictive member and comparator means to produce the electrical signal when the oscillating component has a magnitude greater than a predetermined value.

4. The ink ejection apparatus of claim 3, in which the comparator means comprises a rectifier, a filter and a voltage comparator.

5. The ink ejection apparatus of claim 3, in which the extraction means comprises a coupling capacitor.

6. The ink ejection apparatus of claim 3 in which the comparator mens comprises a comparator to produce a secondary electrical signal when the oscillating component of the voltage across the electrostrictive member is greater than a second predetermined value and smaller than said predetermined value, the pulse generator being operative to feed the pulse to the electrostrictive member at a first magnitude in the absence of the secondary electrical signal and to feed the pulse to the electrostrictive member at a second magnitude which is higher than the first magnitude in response to the secondary electrical signal.

7. The ink ejection means of claim 3, in which the extraction means comprises a capacitor having a same capacitance as the electrostrictive member and connected in parallel with the electrostrictive member, the comparator means comprising a differential amplifier operative to produce an output corresponding to a difference between the voltage across the electrostrictive member and a voltage across the capacitor.

8. The ink ejection apparatus of claim 7, further comprising resistors connected in series with the electrostrictive member and the capacitor respectively.

* * * * *